M. H. STILLMAN.
GAS VOLUME STANDARD FOR TESTING VOLUME MEASURING APPARATUS FOR GAS.
APPLICATION FILED AUG. 21, 1916.

1,234,505.

Patented July 24, 1917.
3 SHEETS-SHEET 1.

Inventor
Marcenott Stillman.

M. H. STILLMAN.
GAS VOLUME STANDARD FOR TESTING VOLUME MEASURING APPARATUS FOR GAS.
APPLICATION FILED AUG. 21, 1916.

1,234,505.

Patented July 24, 1917.
3 SHEETS—SHEET 2.

Inventor

Marcus H Stillman.

M. H. STILLMAN.
GAS VOLUME STANDARD FOR TESTING VOLUME MEASURING APPARATUS FOR GAS.
APPLICATION FILED AUG. 21, 1916.

1,234,505.

Patented July 24, 1917.
3 SHEETS—SHEET 3.

Inventor
Marcus H. Stillman.

UNITED STATES PATENT OFFICE.

MARCUS H. STILLMAN, OF WASHINGTON, DISTRICT OF COLUMBIA.

GAS-VOLUME STANDARD FOR TESTING VOLUME-MEASURING APPARATUS FOR GAS.

1,234,505.  Specification of Letters Patent.  Patented July 24, 1917.

Application filed August 21, 1916. Serial No. 116,198.

(DEDICATED TO THE PUBLIC.)

*To all whom it may concern:*

Be it known that I, MARCUS H. STILLMAN, a citizen of the United States, and an employee of the Bureau of Standards, United States Department of Commerce, a legal resident of the District of Columbia, residing at the city of Washington therein, (whose post-office address is 2111 18th street,) have invented a new and useful Gas-Volume Standard for Testing Volume-Measuring Apparatus for Gas, and have made application by petition of even date herewith under the act of March 3, 1883, chapter 143, 22 Stat., 625, praying that Letters Patent therefor may be granted to me.

The invention herein described and claimed may be used by the Government of the United States, or by any of its officers or employees in the prosecution of work for the United States, or by any person in the United States, without payment of any royalty thereon.

The following is a specification of the invention:

The principal object of my invention is to furnish a portable apparatus by means of which gasometers, meter provers, etc., may be accurately and conveniently tested. Its uses are not restricted to the above-mentioned, however, for it may evidently be used for many other purposes which require the accurate measurement of a definite quantity of air or other gas.

Figure 1:
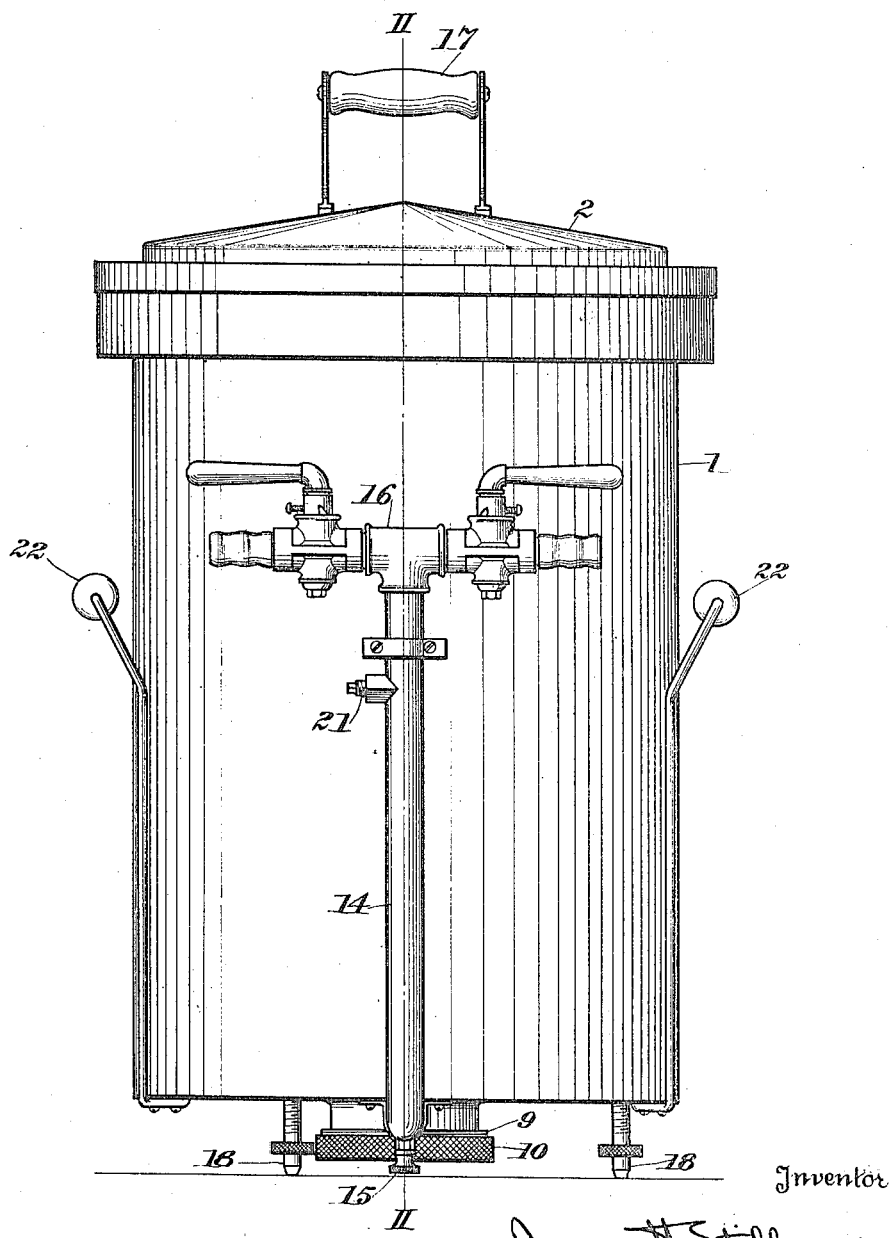
Figure 2:
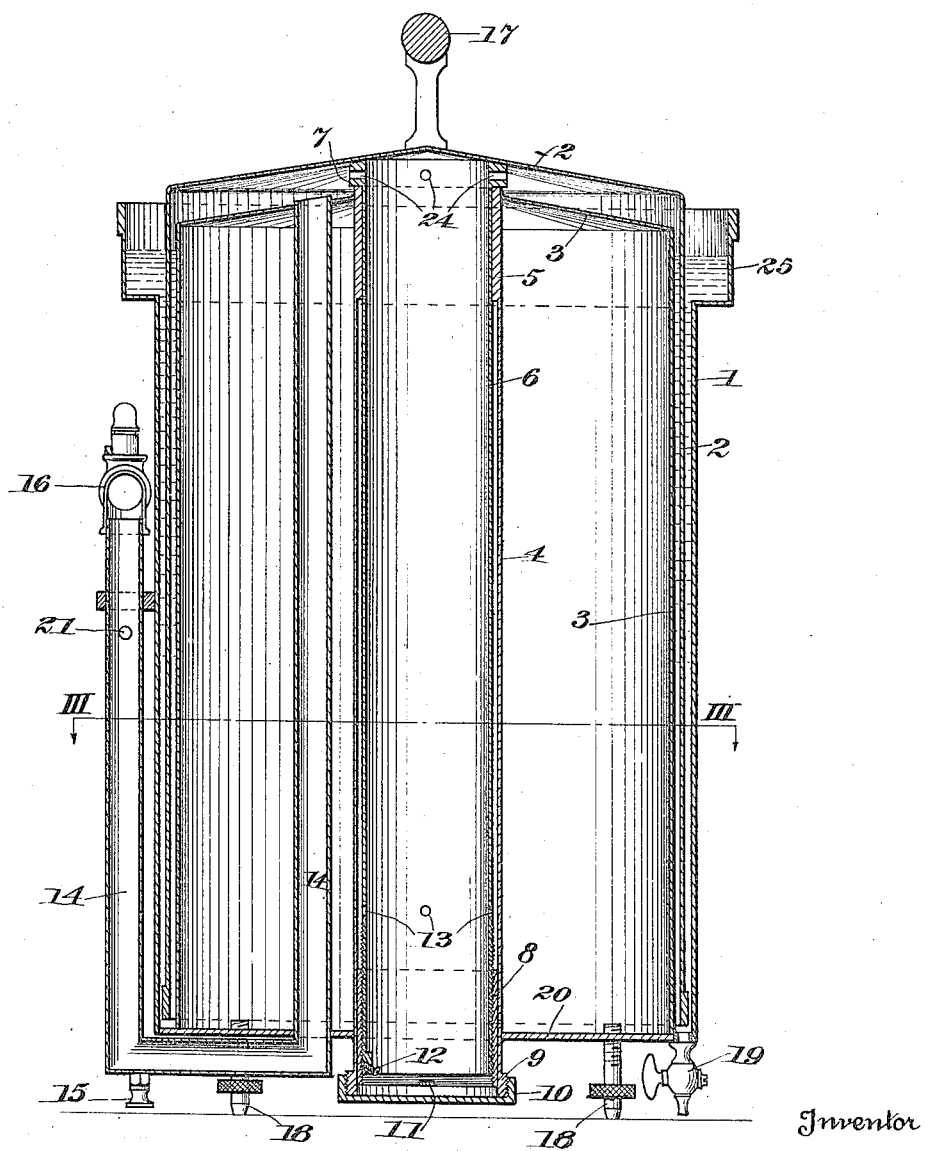
Figure 3:
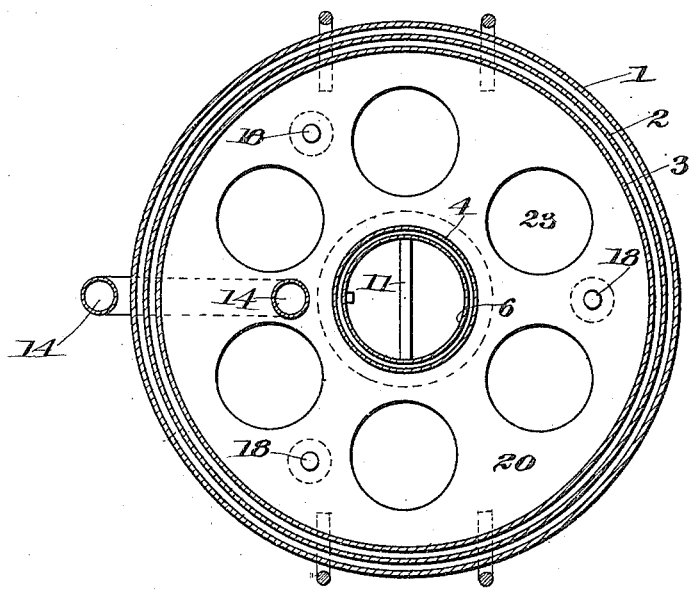
Figure 4:
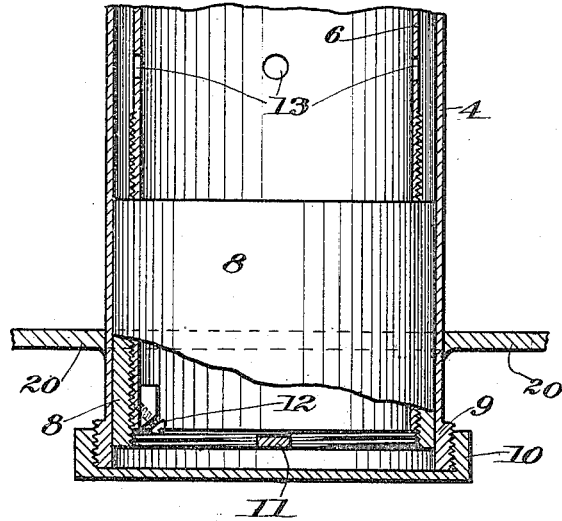
Figure 5:
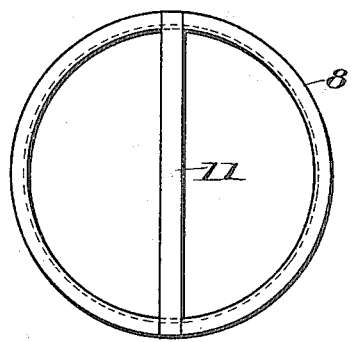

Figure 1 is an elevation of the instrument showing its external appearance. Fig. 2 is a vertical cross-section along the line II—II (Fig. 1). Fig. 3 is a horizontal projection on line III—III (Fig. 2). Fig. 4 is a detail partly in section of the lower part of the guiding and stopping mechanism. Fig. 5 is a detail of the lower adjustable guiding ring and stop.

In all of the drawings, the same numerals of reference are used to designate the same or similar parts.

Referring to the drawings, 1 and 3 are co-axial cylinders, the annular space between them being closed at the bottom by the outer portion of the base plate 20. This constitutes an annular tank in which the cylinder 2 closed at the top as shown and hereafter referred to as the bell, may be moved up and down guided by the sliding mechanism at the axis of the apparatus which sliding mechanism will be described in the next paragraph. The inner cylinder 3 is also closed at the top and will be hereafter referred to as the core. The clearance space between the sides of the core and bell is made as small as is consistent with freedom of motion in order to minimize the changes in the height of the sealing liquid within this space due to changes in the gas pressure within the bell. This results in rendering negligible the errors due to the small pressure changes that ordinarily occur. The diameter of the top of the outer cylinder 1 is enlarged to form a reservoir 25 of such capacity that the raising and lowering of the bell will not cause an excessive change in the height of the sealing liquid.

The guiding mechanism referred to above, consists primarily of two telescoping tubes 4 and 6, the inner tube 6 being securely fastened to the inside of the top of the bell 2 and consequently sliding as the bell is raised and lowered up and down within the stationary tube 4 which is secured gas tight to the core 3 and to the bottom plate 20. The interior of the upper end of the outside tube 4 is provided with a thickened portion or ring 5 which is of such a thickness as to closely fit around the inside tube 6. The exterior of the lower end of the inside tube 6 is provided with a screw thread to which is screwed by means of the handle 11 thereon, a ring or collar 8 of such a thickness as to closely fit the inside surface of the outside tube 4. There is thus provided for the bell a guiding mechanism permitting very little lateral motion. It is evident that when the bell 2 is raised by means of the handle 17, the upward motion will be limited by the collar 8 coming in contact with the shoulder formed by the collar 5. It is also evident that the height to which the bell can be raised may be regulated by screwing the collar 8 up or down upon the inner tube 6. This adjustable collar 8 when adjusted is fixed to the tube 6 by means of the set screw 12. The lowest position of the bell is established by the collar 7, which is fastened to the bell and inside guide tube 6, coming in contact with the upper end of the outer stationary guide tube 4 and its attached collar 5.

The wall of the lower end of the outside tube 4 is thickened and provided with an external screw thread which is engaged by the externally threaded cap 10, making therewith a gas tight joint. In order to connect the interior of this guiding mechanism with the chamber inside of the bell 2, several holes 24, are provided through the upper end of the tube 6 and attached collar 7, and another set of holes 13 pass through the inside guide tube 6.

To connect the chamber inside of the bell 2, with the free air or with any other volume of gas, the tube 14 passes gas tight through the top of the core, down through the bottom 20 and up to the valves 16. 21 is an opening to which a manometer or other pressure-measuring device may be connected.

A stop cock 19 is connected to the bottom of the annular tank in order to provide a means of removing the sealing liquid which normally fills the tank up to approximately the height shown in Fig. 2.

The gas conductor 14 is provided with a drain cock 15 which is used to remove any sealing or other liquid which may accidentally enter the conductor.

Screw feet 18 are inserted into the bottom 20 in order that the entire apparatus may be easily leveled.

A number of large holes 23 are placed in the bottom 20 in order to decrease the weight of the apparatus and to allow the air of the room to get within the core and thereby more quickly equalize the temperatures of the apparatus and the room.

The operation of the apparatus is as follows:

The annular tank having been filled with water or preferably an oil of small vapor pressure and small viscosity, the raising of the bell 2 to its upper limit by means of the handle 17 draws into the interior of the bell through the valve 16 and tube 14 a definite volume of gas, the magnitude of which volume depends, for a given apparatus, upon the distance the bell can be raised which is the distance between the stops 5 and 8. If the bell be now lowered to its initial position, it is obvious that the same definite volume of gas will be expelled.

By making the bell of suitable diameter and by adjusting the length of stroke of the bell by means of the lower stop 8, the apparatus may be made to receive or deliver with great accuracy any desired volume as, for example, 1 cubic foot. Then by connecting one of the valves 16 to a meter prover or other gas-measuring device which it is desired to calibrate, an exact cubic foot of gas or air may be conveniently introduced into the gas-measuring device or removed from it.

What I claim as my invention is:

1. In a volume standard for gas, the combination with a chamber adapted to contain liquid of a plunger adapted to be introduced into and withdrawn from said chamber and provided with a chamber which is bounded on one side by said liquid and which varies in capacity as the plunger is introduced or withdrawn, means for admitting gas into said chamber and permitting its discharge therefrom, means for guiding the movements of said plunger, and stops, one of which is adjustable, for limiting said movements.

2. The herein described volume standard for gas, comprising in combination a core, a jacket surrounding said core, a base rigidly connecting said jacket and core and constituting therewith an annular tank, a liquid seal in said annular tank, a bell telescoping into said annular tank, means for raising and lowering said bell relative to the tank, a guiding member rigid with the core, a second guiding member rigid with the bell and operating in conjunction with the first said guiding member, interengageable parts on said guiding members, said interengageable parts constituting positive stops to fix both the upper and lower limits of the vertical movement of the bell relative to the tank, and a valve controlled passage for conducting gas to and from the interior of the bell.

3. The herein described volume standard for gas comprising in combination a core, a jacket surrounding said core and having an enlarged upper portion forming a reservoir, a base rigidly connecting said jacket and core and constituting therewith an annular tank, a liquid seal filling said tank to a level in said reservoir, a bell telescoping into said annular tank, means for raising and lowering said bell relative to the tank, a guiding member rigid with the core, a second guiding member rigid with the bell and operating in conjunction with the first said guiding member, interengageable parts on said guiding members, said interengageable parts constituting positive stops to fix both the upper and lower limits of the vertical movement of the bell relative to the tank, and a valve controlled passage for conducting gas to and from the interior of the bell.

4. The herein described volume standard for gas, comprising in combination a core, a jacket surrounding said core, a base rigidly connecting said jacket and core and constituting therewith an annular tank, a liquid seal in said annular tank, a bell telescoping into said annular tank, means for raising and lowering said bell relative to the tank, a guiding member rigid with the core and substantially concentric therewith, a second guiding member rigid with the bell and operating in conjunction with the first said guiding member, interengageable parts on said guiding members, said interengageable parts constituting positive stops to fix both the upper and lower limits of the vertical movement of the bell relative to the tank, and a valve controlled passage for conducting gas to and from the interior of the bell.

5. The herein described volume standard for gas, comprising in combination a core, a jacket surrounding said core, a base rigidly connecting said jacket and core and constituting therewith an annular tank, a liquid seal in said annular tank, a bell telescoping into said annular tank, means for raising and lowering said bell relative to the tank, a tubular guiding member rigid with the core and substantially concentric therewith, a second guiding member rigid with the bell and telescoping with the first said guiding member, interengageable parts on said guiding members, said interengageable parts constituting positive stops to fix both the upper and lower limits of the vertical movement of the bell relative to the tank, and a valve controlled passage for conducting gas to and from the interior of the bell.

6. The herein described volume standard for gas, comprising in combination a core, a jacket surrounding said core, a base rigidly connecting said jacket and core and constituting therewith an annular tank, a liquid seal in said annular tank, a bell telescoping into said annular tank, means for raising and lowering said bell relative to the tank, a tubular guiding member of circular cross section rigid with the core and substantially concentric therewith, said tubular guiding member having its lower end closed to the passage of gas, a second tubular guiding member of circular cross section telescoping with the first said guiding member and making rigid connection to the bell by having its top end firmly connected to the inside of the top of the bell, said second guiding member having an opening or openings in its wall near its upper end whereby its interior is brought into communication with the interior of the bell.

7. The herein described volume standard for gas, comprising in combination a core, a jacket surrounding said core, a base rigidly connecting said jacket and core and constituting therewith an annular tank, a liquid seal in said annular tank, a bell telescoping into said annular tank, an operating handle attached to top of said bell by means of which said bell may be raised or lowered relative to the annular tank, a tubular guiding member of circular cross section rigid with the core and substantially concentric therewith and having its lower end externally threaded, an internally threaded cap, said cap being screwed upon said externally threaded portion of said guiding member thereby effectually closing the lower end of said guiding member, a second tubular guiding member of circular cross section rigidly connected to the top of the bell and telescoping into the first said guiding member, second said guiding member being provided at its upper end with an opening or openings connecting its interior with the interior of the bell and being provided near its lower end with other opening or openings connecting its interior with the space between the first named guiding member and itself, interengageable parts on said guiding members constituting positive stops to limit the vertical movement of the bell relative to the tank, one of said parts consisting of an internal sleeve rigidly fastened to the top of first named guiding member and having slidable contact with the outside surface of the second named guiding member, a second part consisting of a collar surrounding the top of second named guiding member and a third part consisting of an adjustable sleeve threaded on to the lower end of the second named guiding member and having slidable contact with the interior surface of the first named guiding member, and a valve controlled passage for conducting gas to and from the interior of the bell.

MARCUS H. STILLMAN.

Copies of this patent may be obtained for five cents each, by addressing the "Commissioner of Patents, Washington, D. C."